United States Patent Office 3,100,656
Patented Aug. 13, 1963

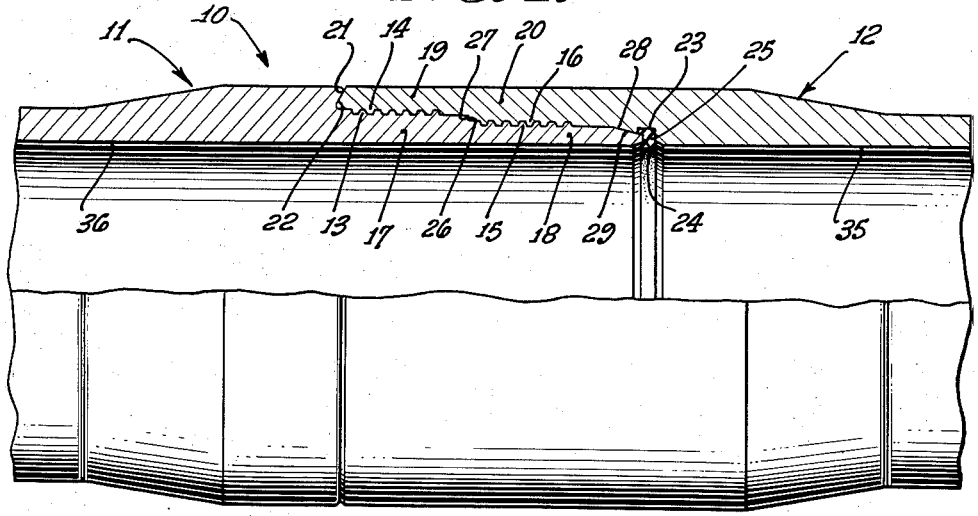
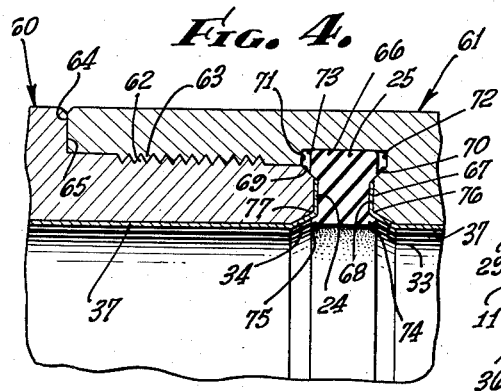
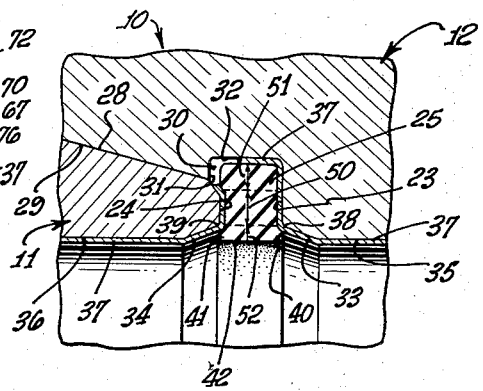
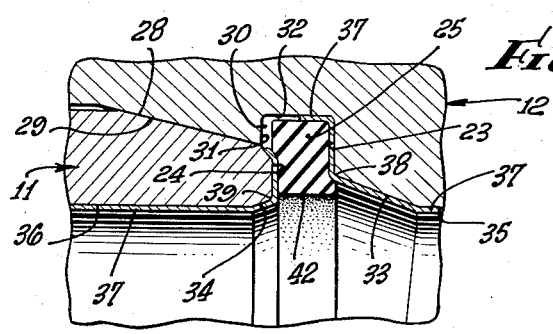
MELVIN D. MacARTHUR
INVENTOR.
BY *White & Haefliger*
ATTORNEYS.

3,100,656
SYNTHETIC RESIN SEAL RING IN TUBING JOINT FOR PLASTIC COATED TUBING
Melvin D. MacArthur, Glendale, Calif., assignor to Hydril Company, Los Angeles, Calif., a corporation of Ohio
Filed May 11, 1959, Ser. No. 812,238
7 Claims. (Cl. 285—55)

This invention relates generally to improvements in well pipe joints and more particularly has to do with the construction of sealed and screw threaded pipe joints characterized in that a ring insert may cooperate with a protective interior pipe coating to prevent corrosive and physical damage to the coating during make-up and breaking apart of the joint and also during use of the joint in a corrosive environment, the ring also being effective to prevent outward escape of high fluid pressure from the joint.

In corrosive oil or gas distillate wells, the problem of protectinng the steel well tubing against the attack of the corrosive production fluid is difficult. The most commonly used protections on standard steel tubings are interior surface coatings including nickel or chrome plating (electrolytic or chemical), interior sheathing of stainless steel, or aluminum, or other corrosive resistant material, and plastic interior coating in the form of a hard corrosion resistant film applied by either spraying or dipping. This third type corrosion resistant oil well tubing is currently preferred as it performs satisfactorily, is economical, and also has the advantage of resisting hydrogen embrittlement which often accompanies corrosion. However, while plastic coatings have been successful in protecting the pipe body, they have not been well accepted for pipe joint coverage, prior to the present invention.

Typically, the plastic coating will be sprayed on the pipe bore and will not have uniform thickness circumferentially of the bore, since the liquid plastic will tend to drain toward the lower side of the bore. It is found that such nonuniformity of coating thicknesses acts detrimentally to prevent desired make-up of a pipe joint, particularly if a thin sealing ring or gasket is used between coated cylindrical surfaces of pin and box members, a thick coating in one area causing jamming of the pin and box members before they are entirely made-up. Where such a sealing ring is used, its thickness is severely limited for the reason that the load bearing sectional thickness of the box member or pin member must decrease as the ring radial thickness increases. Thus the ring thickness, which is controllable, in practice approaches the coating thickness which is locally relatively uncontrollable, leading to probable local jamming of the coated pin and box members on the seal ring before the joint is made-up.

It is a major object of the present invention to provide a joint of a construction alleviating the above mentioned difficulties, the joint being characterized in that it comprises coaxial pin and box members respectively including interengaged external and internal threads holding the pipes against separation, the pin member being screwed about the joint axis longitudinally forwardly into the box member. The latter has an annular recess opening inwardly and extending about the free terminal forward end of the pin member and the box member has an annular shoulder spaced forwardly of and facing the forward end of the pin member. An annularly continuous ring of internally tenacious relatively rigid lubricous plastic material is received in the recess and in the space between the forward end of the pin member and the box shoulder, the ring being compressed by and between the pin forward end and the box shoulder. More importantly, the entire forwardmost annular extent of the pin member penetrates the body of the ring material to anchor the ring in active sealing position against displacement therefrom by application of fluid pressure, the pin and box members having interengaged stop shoulders limiting penetration of the pin member into the ring.

There is preferably a thin protective resinous coating on the pin and box member bores and on the pin member forwardmost extent, the ring seal having axial and radial thicknesses at least several times greater than the coating thickness and the ring being only resiliently compressed in order that pressure build-up in the body of the ring may be kept below the point where the plastic coating at the forwardmost terminal end of the pin member would be stripped off, leaving bare metal exposed to corrosive liquid in the pipe string. In this connection, the pin and box members are formed to have coaxial bevels intersecting the box shoulder and the pin free end at opposite sides of the seal, thereby reducing the angularity of these intersections and locating them so as to be fully overlapped by the ring material acting as a corrosion barrier to protect the coated intersections against contact with corrosive liquid in the pipe. Generally speaking, the invention contemplates the provision of a ring seal having an I-shaped cross section in an axial radial plane, as will be further described. As a result of this construction, the joint will make-up properly in spite of variable thickness of the coating, and the ring seal is repeatedly usable without need of replacement.

Other objects and advantages include the provision of an annularly continuous ring seal, preferably comprising tetrafluoroethylene, which remains in ringlike or orbicular compression in the box recess when the pin member is both in and out of compressive and penetrating engagement with the ring seal. As a result, the ring remains pre-loaded when located in the box member recess, and is not locally radially inwardly deformed from annular shape by screwing of the pin member into the box member tending to drag the ring seal circularly within the recess.

These and other objects and advantages of the invention, as well as the details of an illustrative embodiment, will be more fully understood from the following detailed description of the drawings, in which:

FIG. 1 is a longitudinal section taken through the joint showing it in fully made-up condition;

FIG. 2 is an enlarged fragmentary showing of the joint seen in an axial radial plane;

FIG. 3 is a view similar to FIG. 2 but showing a condition which the design and construction of the FIG. 2 joint prevents; and FIG. 4 is a view similar to FIG. 2, showing an alternate form of the joint.

In FIGS. 1 and 2, the joint 10 therein shown includes a pin member 11 and box member 12 having interengaged threads 13 and 14 in one step, and interengaged threads 15 and 16 in a second step. The coupled together pin and box members are of the two-step type, with the pin threads 13 and 15 being cut on steps 17 and 18 respectively, these threads having the same pitch and outline characteristics. Likewise, box member threads 14 and 16 are complementary to pin threads 13 and 15 and are cut on steps 19 and 20. At the outer end of the box there is provided a tapered stop shoulder 21 which is complementary to an opposed pin stop shoulder 22, while at the inner end of the box there is a square cut shoulder 23 axially spaced from and facing the square cut pin shoulder 24, an annular ring seal 25 being compressed therebetween.

When the joint is fully made-up pin and box square cut shoulders 26 and 27 are also in interengagement limiting such make-up, and forwardly tapered pin and box stop shoulders 28 and 29 are in compressive engagement near the forward end of the pin.

The box member has an annular recess 30 opening inwardly and extending about the free terminal end of the pin member 11, the recess 30 being formed by the box member shoulder 23, another box member shoulder 31 extending radially outwardly from the pin taper 28, and the annular recess wall 32. Both the box and pin members have rather shallow bevels or chamfers 33 and 34 intersecting the box and pin bores 35 and 36, and also intersecting the box shoulder 23 and the pin forwardmost extent 24, respectively. These bevels are generally coaxial and typically will extend at around 20° angularity with the bores 35 and 36 as illustrated.

The bores 35 and 36, bevels 33 and 34, recess walls 23, 31 and 32, and the pin forwardmost extent 24 are all covered or coated with a smooth and uninterrupted thin protective layer or coating shown generally at 37. The coating is typically sprayed on to a thickness of about .002 to .006 inch. It may for example comprise a phenolic resin such as phenol formaldehyde, and it acts not only to prevent contact of corrosive liquid in the pipe and joint metal but also retards the accumulation of paraffin in oil well production pipes.

The most critically coated regions are the intersections 38 and 39 of the bevels 33 and 34 with the recess wall 23, and the pin forwardmost extent 24 respectively, since these intersections extend at the sharpest angularity. The coatings 37 tend to diminish in thickness over the sharp intersections or corners, and it is an important object of the invention to protect these coated intersections from lack of coverage due to natural surface tension of plastic, when liquid, drawing away from the sharp edge leaving a line holiday. This line coverage is brought about by forming the ring seal 25 to have thickness in axial and radial directions substantially greater than the thickness of the coating 37, by utilizing an internally tenacious relatively rigid and lubricous plastic material, typically tetrafluoroethylene, and very importantly by causing the ring to take the shape shown in FIG. 2 when the joint is made-up, this cross section configuration being characterized as generally "dumb-bell" or I-shaped.

The seal is axially compressed by and between the coated pin forward end and the coated box shoulder 23 which have relatively large clearance therebetween, and the entire forwardmost annular extent of the pin member penetrates the body of the ring seal material to anchor the ring in sealing position against displacement by application of fluid pressure to the seal. As a result, the ring seal bulges at locations 40 and 41 in overlapping relation with the coated intersections 38 and 39, doubly protecting the intersections, along with the coatings covering the intersections, against contact by corrosive liquid in the pipes. Such protection is assured in spite of differential coating thickness, so that the joint may be said to have good tolerance of bad coating. As defined herein the forwardmost extent of the pin member will be considered to include the coating on the pin metal. As is clear from FIG. 2, the rearwardmost portion of the recess is hollow.

It was found that if the ring seal 25 is not initially slightly over-size in diameter in relation to the diameter of the coated recess wall 32, there is a tendency for the ring to be locally deranged in an unpredictable manner as the joint is made-up; for example a local section of the ring may become bodily displaced inwardly radially into the pipe bore, during compression, as a bulge. Also, at certain local points some of the ring material tended to move radially outward more than at other points around the ring periphery, and on some plastic coated samples a small localized lump of plastic could initiate serious inward displacement of the ring material. Tests showed that this writhing can readily be controlled and directed radially outward all around the radial outer surface of the ring if the ring is initially pre-compressed in a radial direction, this condition being brought about by using a ring that is slightly over-size in diameter in relation to the diameter of the coated recess wall 32. Also, it was found that the ring, though unsupported at its inner diameter, can withstand up to 2200 p.s.i. external pressure tending to force the ring radially inwardly if about 45% of the center section of the ring is axially compressed by the pin forwardmost extent, as shown at 50 in FIG. 2, and if about 40% and 15% of the ring section at the outer and inner sides of the compressed section 50, respectively, remain axially uncompressed by the pin, as seen at 51 and 52. As is clear from the drawings and description, the locus of the radial compression of the ring is generally outward and forward of the locus of the pin member forwardmost extent when the joint is fully made up.

It is an important feature of the invention that the ring is resiliently compressed by the pin, thereby limiting the pressure exerted on the coating 37 which covers the forwardmost extent of the pin member. That particular coating is necessarily rotated in sliding engagement with and relative to the ring seal as the joint is made-up. Such resilient compression of the ring, the extent of which is controlled by engagement of the pin and box member stop shoulders 21 and 22, and 26 and 27, assures against wiping away of the coating at the forwardmost extent of the pin member, which might result in exposure of the pin free end 24 to corrosive liquid within the pipe, were it not for the ring seal 25 which covers and protects the penetrating forward end portion of the pin. Thus, the ring seal acts to prevent contact of corrosive liquid with the pipe forwardmost extent.

The ring 25 has an inner diameter at 42 which is at least as large as the coated bore diameters of the pin and box members, leaving the bore uninterrupted for passage therethrough of well tools which cannot therefore shear off portions of the ring seal. At the same time, the angular intersections 38 and 39 remain protected by the overlapping seal bulges 40 and 41 as previously described. The ring seal has an initial inner diameter less than the diameters of the circular intersections 38 and 39, assuring sealing or compressive overlapping of these intersections by the seal ring as it is axially compressed by the pin. Such total coverage is also assured by making the bevels 33 and 34 coaxial. Also, the axial length of the recess between the shoulders 23 and 31 is greater than the axial thickness of the ring as illustrated in FIG. 2, leaving space into which the ring may deform outwardly in response to penetration of the pin forward end and into the ring, as described. Therefore, ring deformation is accordingly controlled in desired manner, and within the limitations of actual joint fabrication procedures.

FIG. 2 indicates the streamlined or relatively smooth transition of the pipe string bore contour at the joint locations, resulting from the provision of shallow bevels or chamfers 33 and 34 and the ring seal 25, the inner diameter 42 of which is in the space between these bevels. This construction results in excellent piloting of inside tools so as to minimize chipping of the bore coat 37 by impact of such tools with exposed coated edges.

Referring to FIG. 3, the joint shown therein illustrates an undesirable condition which cannot occur in the FIG. 2 joint. In particular the chamfers or bevels 33 and 34 are eccentric and are not coaxial, as they are in FIG. 2. As a result in FIG. 3 the intersection 39 is not protected by overlapping of the seal 25 and corrosive liquid can have much better access to the thinly covered or coated intersection 39. Also, less of the ring seal body is compressed between the pin shoulder 24 and the box member shoulder 23 giving less sealing effect, and leading to probable malfunction and leakage of the seal under high fluid pressure. In FIG. 2 on the other hand, equal diameter bevels 33 and 34 are formed coaxially with the pin and box member threads, which when screwed into interengagement positively locate the bevels 33 and 34 in uniform relation as illustrated.

The ring 25 is most desirably approximately square in cross section taken in an axial radial plane as seen in FIG. 2, for the reason that a circular cross section ring tends to roll or cock during assembly and when subjected to the rotary compressive engaging action of the pin member, this rolling action seriously interfering with or preventing complete overlapping of the coated intersections 38 and 39 by the ring. By making the ring approximately square in cross section, it becomes stabilized against such rolling action.

In FIG. 4 the joint shown includes a pin member 60 and box member 61 having interengaged threads 62 and 63. At the outer end of the box there is provided a square cut stop shoulder 64 which is complementary to an opposed pin stop shoulder 65, engagement of these shoulders limiting forward penetration of the coated pin member forward end 24 into the ring seal 25.

The box member has an annular recess 66 opening inwardly and extending about the free terminal forward end of the pin member 60 and also about a box member boss 67 projecting axially rearwardly toward the pin member free end, to which the boss is complementary or similar in shape. Thus, the boss has a coated free terminal end 68 opposite the pin coated end 24, the pin and boss have like coaxial chamfers or bevels 33 and 34 as previously described, and they have like and opposite tapers 69 and 70 which together with the box member walls 71, 72 and 73 form the dovetail recess 66.

The annular ring seal 25 typically has an initially rectangular cross section in an axial radial plane and is slightly diametrically over-size in relation to the diameter of recess wall 66, whereby the seal is pre-compressed in the recess to seal against the recess interior wall. It is also initially spaced from the recess walls 71 and 72 so as to allow bulging or extruding of the stressed outer portion of the seal into those spaces as the joint is made-up with the pin forwardmost end and the boss 67 penetraing into axially opposite sides of the rectangular seal. Bulging of the seal also takes place at locations 74 and 75 in protective overlapping relation to the coated circular intersections 76 and 77 of the chamfers 33 and 34 with the ends 68 and 24 of the boss 67 and the pin.

The ring seal 25 is clearly I-shaped in cross section after make-up of the joint, and it functions not only as a corrosion barrier in cooperation with the coatings 37, but it also acts as an effectively locked-in-place seal against fluid pressure exerted from within or without the pipe.

I claim:

1. A joint interconnecting a pair of pipes, comprising coaxial pin and box members respectively including interengaged external and internal threads holding the pipes against separation, said pin member being screwed about said axis longitudinally forwardly into said box member, said box member having an annular recess opening radially inwardly and extending about the free terminal forward end of said pin member, and said box member having an annular shoulder at the forward end of the recess and spaced forwardly of and facing said forward end of the pin member, and an annularly continuous ring having substantially the physical characteristics of tetrafluoroethylene received in the recess and in the space between the forward end of the pin member and said box shoulder, said ring being compressed by and between said pin forward end and the box shoulder, the forwardmost extent of the pin member penetrating the body of the ring material to anchor the ring in active sealing position against displacement therefrom by application of fluid pressure, said pin and box members having interengaged stop shoulders limiting penetration of said pin member into said ring, the recess being axially longer than the axial dimensions of the ring and the rearwardmost portion of the recess being hollow, said seal ring being in radially compressed condition before and after the pin member is in compressive engagement therewith, the compressed outer portion of the ring being stressed and extruded over the pin member and into said hollow when the stop shoulders interengage, whereby writhing of the ring during penetration of the pin member into the ring is prevented, the locus of said ring radial compression being generally outward and forward of the locus of the pin member forwardmost extent when the joint is fully made up, and the box recess having an interior wall against which the radially compressed ring outer periphery forcibly seals.

2. The joint as defined in claim 1 in which said pin member has an annular bevel between the pin free end and the pin bore, said box member has an annular bevel between said box shoulder and the box bore, said members have a thin protective resinous coating on the pin and box bores, said bevels, said box shoulder and said pin free end, said ring seal being in overlapping engagement with the coated intersections of said bevels with the box shoulder and pin free end, said ring seal and coating being corrosion resistant.

3. The invention as defined in claim 2 in which said coating is on the recess interior wall extending about the ring seal, and the ring seal periphery is in compressive engagement with the protective coating on the recess interior wall, the bevels being coaxial with said threads.

4. The invention as defined in claim 2 in which said ring seal has axial and radial thicknesses at least several times greater than the coating thickness, and in which the recess is axially longer than the axial dimensions of the ring and the rearwardmost portion of the recess is hollow, the coating thickness being between .002 and .006 inch.

5. The invention as defined in claim 2 in which said seal comprises tetrafluoroethylene.

6. The invention as defined in claim 2 in which said box member shoulder is in a plane normal to the box axis and extending outwardly to the outer periphery of said recess.

7. The invention as defined in claim 2 in which said box member has a boss opposite and projecting axially rearwardly toward said pin free end, said box shoulder being at the rearwardmost extent of said boss.

References Cited in the file of this patent

UNITED STATES PATENTS

| | | |
|---|---|---|
| 595,437 | Greenfield | Dec. 14, 1897 |
| 1,138,946 | Elliott | May 11, 1915 |
| 2,102,072 | Hinderliter | Dec. 14, 1937 |
| 2,110,127 | Hinderliter | Mar. 8, 1938 |
| 2,532,632 | MacArthur | Dec. 5, 1950 |
| 2,553,340 | Smith | May 15, 1951 |
| 2,770,477 | Rankin | Nov. 13, 1956 |
| 2,813,567 | Williams | Nov. 19, 1957 |
| 2,889,733 | Vanderhoof | June 9, 1959 |
| 2,907,589 | Knox | Oct. 6, 1959 |

FOREIGN PATENTS

| | | |
|---|---|---|
| 833,048 | France | June 22, 1943 |